United States Patent [19]
Denoux

[11] Patent Number: 5,451,181
[45] Date of Patent: Sep. 19, 1995

[54] TOY VEHICLE WITH OPTICALLY INTERACTIVE IMAGING

[76] Inventor: Alain F. Denoux, 8800 SW. 64th Ct., Miami, Fla. 33156

[21] Appl. No.: 195,804

[22] Filed: Feb. 14, 1994

[51] Int. Cl.6 .................. A63H 33/22; A63H 17/00; G03B 25/02
[52] U.S. Cl. .................. 446/465; 446/470; 446/219; 40/454
[58] Field of Search .................. 40/454, 591; 446/468, 446/467, 470, 471, 219, 175, 93, 448, 449, 479, 476; 434/81

[56] References Cited

U.S. PATENT DOCUMENTS

| | | |
|---|---|---|
| 244,132 | 7/1881 | Ireland . |
| 444,236 | 1/1891 | Rowe . |
| 453,209 | 6/1891 | Ratliff . |
| 624,042 | 5/1899 | Jacobson . |
| 624,043 | 5/1899 | Jacobson . |
| 1,128,979 | 2/1915 | Hess . |
| 1,317,561 | 9/1919 | Dougherty . |
| 1,530,888 | 3/1925 | Grooms . |
| 1,851,705 | 3/1932 | Herz . |
| 1,883,291 | 10/1932 | Ives . |
| 1,904,867 | 4/1933 | Kurtz . |
| 1,905,469 | 4/1933 | Ives . |
| 1,918,705 | 7/1933 | Ives . |
| 2,140,702 | 12/1938 | Kanolt . |
| 2,313,947 | 3/1943 | Klinkum . |
| 2,401,937 | 7/1946 | Kingson . |
| 2,522,812 | 9/1950 | Bonnet . |
| 2,724,917 | 5/1952 | Norfleet ........................ 40/591 |
| 2,832,593 | 4/1958 | Anderson ................... 40/454 X |
| 3,365,350 | 1/1968 | Cahn . |
| 3,688,045 | 8/1972 | Ohkoshi . |
| 3,693,281 | 9/1972 | Wolf ........................ 446/88 |
| 4,111,695 | 9/1978 | Yevick . |
| 4,154,504 | 5/1979 | Mohs ........................ 40/591 X |
| 4,244,144 | 1/1981 | Goldberg et al. ............... 446/470 X |
| 4,280,300 | 7/1981 | Kulesza et al. . |
| 4,713,012 | 12/1987 | Poplawski et al. .............. 434/81 X |
| 4,915,633 | 4/1990 | Auer et al. . |
| 4,935,335 | 7/1990 | Fotland . |
| 5,009,020 | 4/1991 | Watanabe .................. 40/591 X |
| 5,011,446 | 4/1991 | Feinberg .................... 446/476 X |
| 5,092,806 | 3/1992 | Brown ........................ 446/88 |
| 5,316,513 | 5/1994 | Nakagawa et al. .............. 446/219 X |

Primary Examiner—Robert A. Hafer
Assistant Examiner—D. Neal Muir
Attorney, Agent, or Firm—Bradford E. Kile; Ruffin B. Cordell; Michael J. McKeon

[57] ABSTRACT

A toy vehicle having a body with a plurality of defining surfaces. A transparent cabin is mounted on the body and includes a front surface, a rear surface, a left side surface, a right side surface, and a top surface which is secured on an upper section of the vehicle body. An optical sheet is secured to and lines an inner surface of the transparent cabin such that a toy vehicle user is able to easily view images on the optical sheet through an outer surface of the transparent cabin. The optical sheet is constructed such that when a vehicle user views the vehicle from one vantage point, a first image state of the optical sheet appears, and when the user views the vehicle from another vantage point, a second image state of the optical sheet appears thereby creating changing images and an illusion of motion.

8 Claims, 8 Drawing Sheets

IMAGE STATE II

IMAGE STATE I

IMAGE STATE II

IMAGE STATE I

TOY VEHICLE WITH OPTICALLY INTERACTIVE IMAGING

BACKGROUND OF THE INVENTION

The present invention relates to toy vehicles. More specifically, toy vehicles having an optically active configurations operable to produce two predetermined image states such that as a toy vehicle user plays with and moves the vehicle, the appearance of the image changes from a first image state to a second image state without the requirement of providing moving parts.

One of the most popular toys utilized by children are model and toy vehicles. Often, a toy vehicle is designed to resemble real cars, trucks, planes, helicopters, trains, and boats. Many children have entire collections of different models and versions of vehicles. Over the years toy manufacturers have attempted to develop new and different types of toy vehicles in order to keep children interested and provide enhanced user enjoyment.

One such attempt involved a toy truck vehicle having a scroll of paper with pictures printed thereon. When the vehicle user drives the vehicle the paper scroll is moved so that the image changes as the scroll progresses. This toy vehicle involves relatively costly manufacturing techniques due to a requirement to provide a plurality of moving parts. Furthermore, such a toy tends to be fragile and easily broken during use. Moreover, these toys cannot be manufactured in mini or matchbocks toy vehicle sizes which are quite popular with children.

Other prior art toy vehicles attempt to simulate a real vehicle as much as possible by including such things as odometers and speedometers. As with other prior art toy vehicles, these toys involve a costly manufacturing process due to a requirement for moving parts. Furthermore, these prior art vehicles do not lend themselves to "collection" by children because of the lack of signature qualities.

In the visually interactive toy market, electronic miniaturization sophistication has heightened user expectation, even in the very young. Accordingly, it would be highly desirable to provide a toy vehicle that is visually active so as to capture an element of mystery and wonder in the eye and mind of a young toy vehicle user. Concomitantly, it would be highly desirable to create a toy vehicle that could be facilely manufactured without moving parts, will admit to production is mini as well as large sizes and is highly rugged and durable for use by all ages.

The difficulties and limitations suggested in the proceeding are not intended to be exhaustive, but rather are among many which demonstrate that toy vehicles appearing in the past will admit to worthwhile improvement.

OBJECTS AND BRIEF SUMMARY OF THE INVENTION

It is therefore a general object of the invention to provide a novel toy vehicle which will obviate or minimize difficulties of the type previously described.

It is a specific object of the invention to provide a toy vehicle which will be visually interactive and capable of capturing and exciting the imagination of a user.

It is a related object of the invention to provide a toy vehicle that is exciting for children to play with and is designed to maintain a child's interest in the toy.

It is another object of the invention to provide a toy vehicle that utilizes basic optical principles so as to appeal to the wonder of a child.

It is still another object of the invention to provide a toy vehicle that is inexpensive to manufacture and can be facilely constructed.

It is a further object of the invention to provide for toy vehicles that are functionally similar but have distinguishable images so as to encourage collection.

It is yet a further object of the invention to provide a toy vehicle that does not require independent assembly and that is structurally integral so as to be durable and long lasting.

It is still another object of the invention to provide a toy vehicle including humorous images and action that change while the toy is being used.

BRIEF SUMMARY OF A PREFERRED EMBODIMENT OF THE INVENTION

A preferred embodiment of the invention which is intended to accomplish the foregoing includes a toy vehicle having a body with a plurality of defining surfaces. A transparent cabin is mounted on the body and includes a front surface, a rear surface, a left side surface, a right side surface, and a top surface which is secured on an upper section of the vehicle body. An optical sheet is secured to and lines an inner surface of the transparent cabin such that a toy vehicle user is able to easily view images on the optical sheet through an outer surface of the transparent cabin. The optical sheet is constructed such that when a vehicle user views the vehicle from one vantage point, a first image state of the optical sheet appears, and when the user views the vehicle from another vantage point, a second image state of the optical sheet appears thereby creating changing images and an illusion of motion.

DRAWINGS

Other Objects and advantages of the present invention will become apparent from the following detailed description of a preferred embodiment thereof taken in conjunction with the accompanying drawings, wherein.

DETAILED DESCRIPTION

Figure 1:
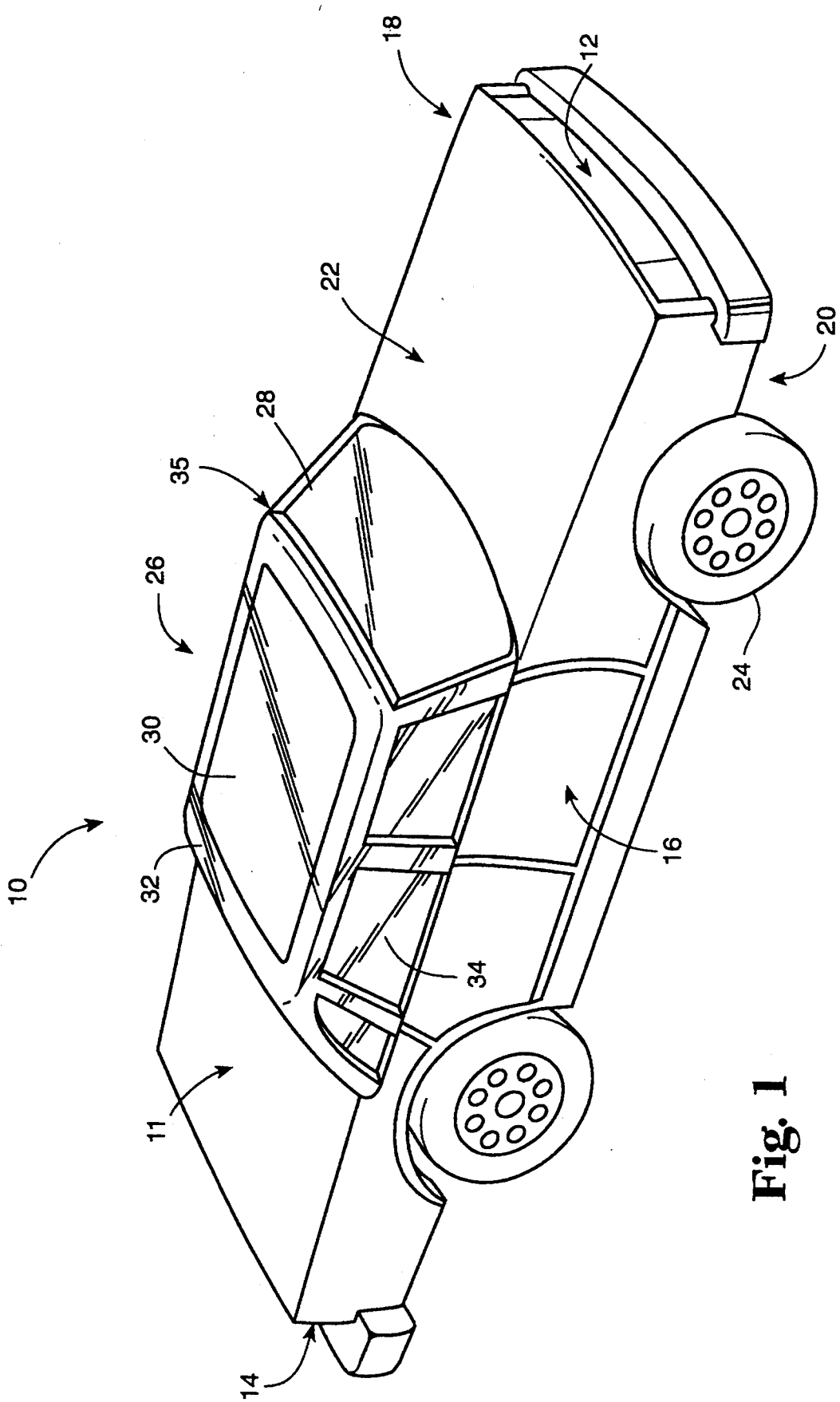
FIG. 1 is an axonometric view of a toy car of the present invention.

Referring now to the drawings and particularly to FIG. 1, a toy vehicle 10 of the invention is depicted in an axonometric orientation. For the purpose of description, the toy vehicle 10 is depicted as a toy car. However, it is within the scope of the invention to have other types of toy vehicles including but not limited to toy planes, toy helicopters, toy trains, and toy boats. The toy vehicle 10 includes a body 11 consisting of a front section 12, a rear section 14, a left side section 16, a right side section 18, lower section 20, and an upper section 22. The toy body 11 is preferable fabricated from a conventional metal or of plastic or a combination of plastic and metal. Preferable, the toy vehicle further comprises four wheels 24 which are journald on axles to permit the vehicle to be driven by a user during play. A different number of wheels may be preferable depending on the type of vehicle such as a car or truck.

The toy vehicle 10 further comprises a cabin 26. In a preferred embodiment, the cabin 26 is constructed of a transparent material such as clear plastic. The cabin 26 preferably consist of a transparent front surface 28, transparent top surface 30, transparent rear surface 32, transparent left side surface 34, and transparent right side surface 35. The cabin 26 is manufactured as a single integral unit and can be easily permanently or releasably secured to the body 11 during the manufacturing process.

Figure 2:
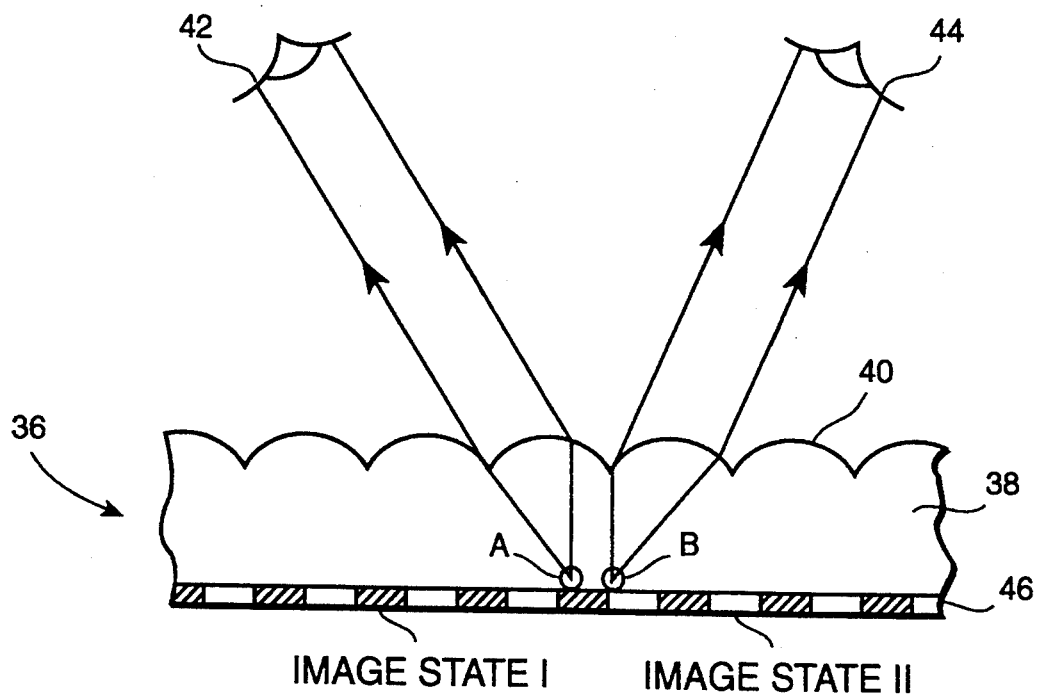
FIG. 2 is a cross-sectional view of an optical sheet operable for use in the invention to create a changing image and an illusion of motion.

The invention further includes an optical sheet 36. The general arrangement of a dual image optical sheet 36 is depicted in FIG. 2. The structural arrangement of optical sheet 36 is well known in the art and does not comprise the present invention per se. Conventionally, however, an optical sheet 36 includes a transparent lenticular lens 38 comprising lenticles 40. The lens 38 functions to provide the dual focal points that is necessary to produce dual imaging. In particular, an observer at a viewpoint or vantage 42 will view an image shown at focal point A, while an observer at viewpoint or vantage 44 will view the image at focal point B. The printed image is formed on a sheet 46 such as paper, paper board or plastic and consists of alternate striae corresponding to an image state I and a modified image state II. In operation, when viewing the sheet 36 from vantage 42, the lens 38 will produce a focal point A thereby presenting image state I to the eye of the user. When viewing the sheet 36 from viewpoint 44, the lens 50 will produce a focal point B thereby producing the modified image state II to the user. This variation in vantage point can be achieved by moving one's head or more usually canting of the lens 38.

Figure 3B:
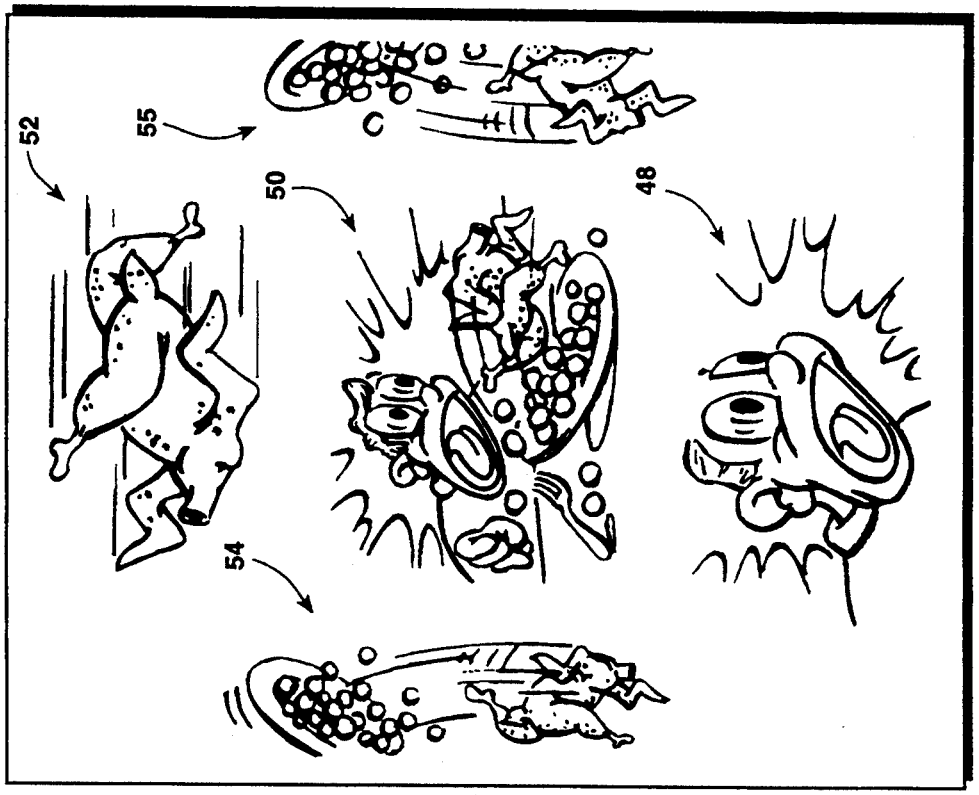
FIGS. 3a and 3b is an example of one embodiment of first and second image states of an optical sheet.
Figure 3A:
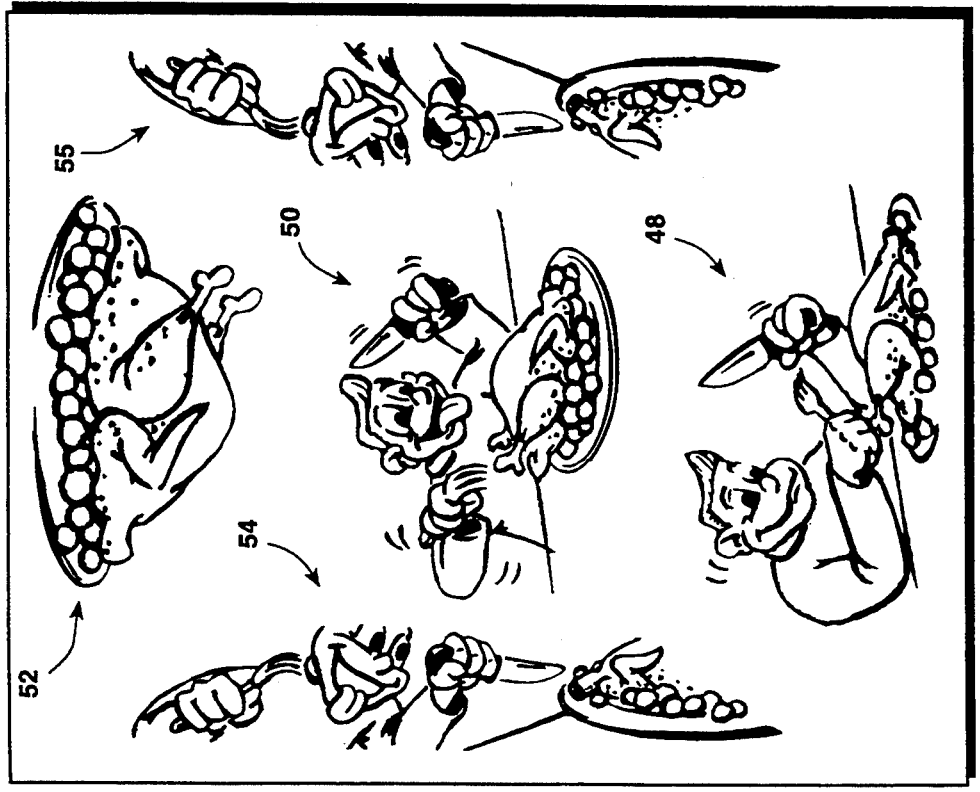
Figure 4B:
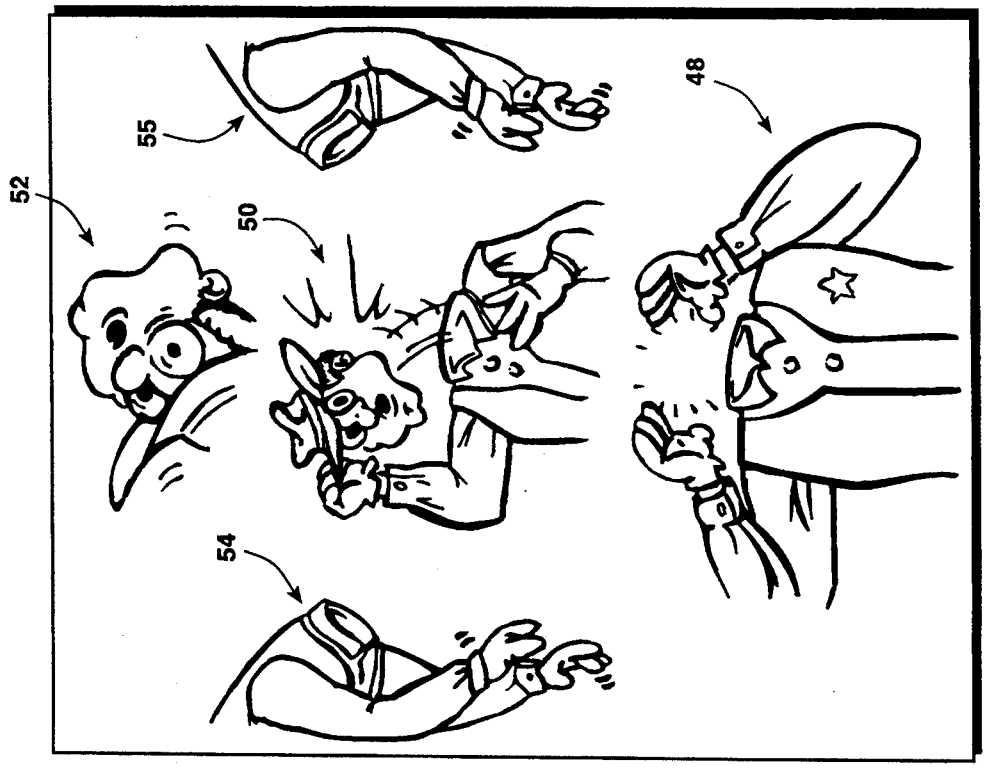
FIGS. 4a and 4b is another example of first and second image states of an optical sheet.
Figure 4A:
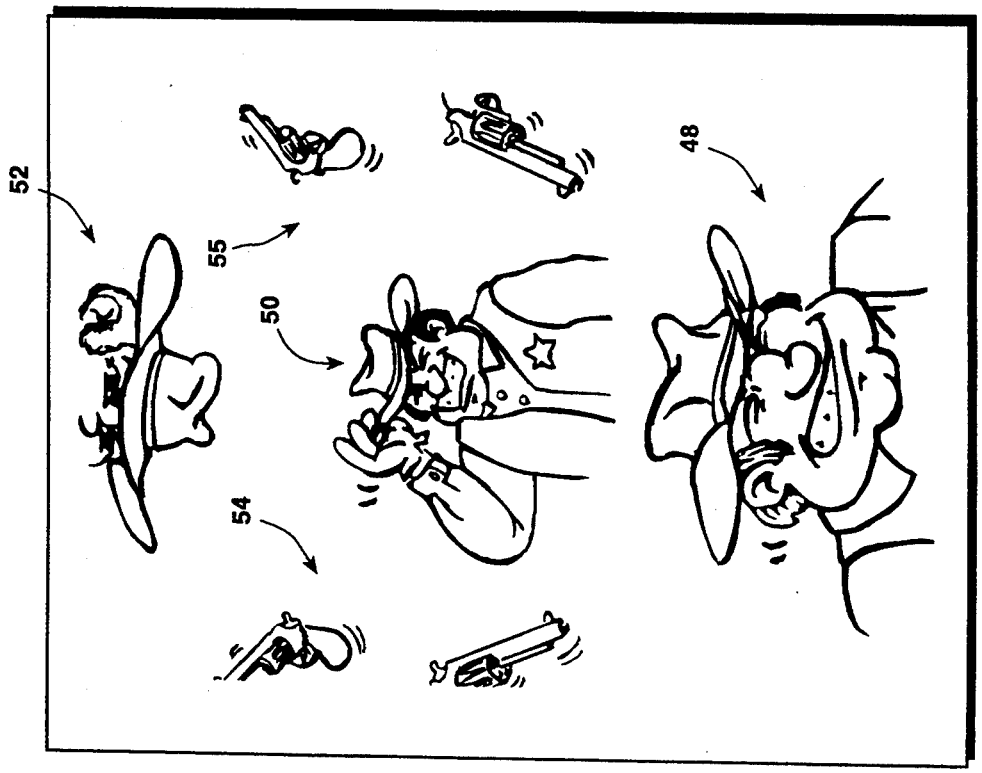

FIGS. 3a, 3b and 4a, 4b are examples of the type of images produced on the sheet 46. Image state I is shown in FIGS. 3a and 4a and corresponds to the image state I shown in FIG. 2. Image state II is shown in FIGS. 3b and 4b and corresponds to the image state II shown in FIG. 2. When a toy vehicle user views the toy surface from viewpoint 42, the user will view the image as shown in FIGS. 3a or 4a. However, as the toy vehicle user drives the toy vehicle and therefore changing from viewpoint 42 to viewpoint 44, the user will view the respective images shown in FIGS. 3b or 4b. Of course, this viewing process may occur rapidly thus giving the illusion of a moving image. This imaging effect provides a unique and interesting toy for children. Furthermore, the toy vehicles utilizing this imaging effect provides for an educational interest in the area of optical science.

The optical sheet 36 is secured to and covers the inner surface of cabin 25. Preferably, the optical sheet is secured in such a way that a different image appears in each of the transparent surfaces 28, 30, 32, 34, and 35 of the cabin 26. The optical sheet consists of a plurality of image zones that correspond in number to the number of transparent surfaces that form the cabin 26. For example, as shown in FIGS. 3a, 3b and 4a, 4b there are five image zones 48, 50, 52, 54, and 55 each having a separate image which corresponds to the transparent surfaces 28, 30, 32, 34, and 35 of the cabin 26. When the toy vehicle user drives the toy vehicle and views through the cabin surfaces, each image appearing on the surfaces will change from image state I to image state II. Of course, an optical sheet may have any number of images.

The transparent portion of the vehicle 10 is not limited to the cabin 26. In an alternative design, a section of the vehicle body 11 could be fabricated of a transparent material. For example, the hood or trunk portion of the upper section 22 of the vehicle body 11 could be transparent. In this alternative design, the optical sheet 36 would be secured on the inner surface of the transparent section in a similar manner as described above. A further alternative design consist of more than one vehicle body section being transparent and having the optical sheet 36 secured on the inner surfaces. Furthermore, the entire vehicle body 11 and cabin 26 could be constructed of a transparent material and have an optical sheet secured on the inner surfaces.

Figure 5:
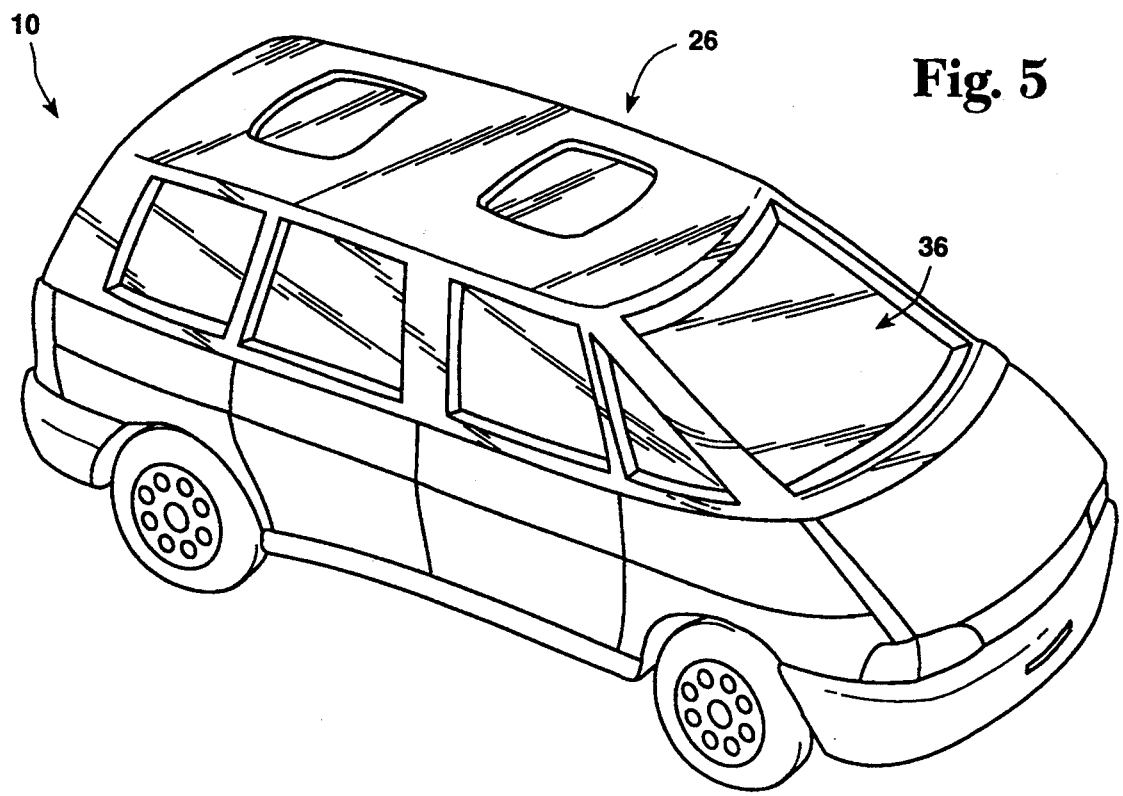
FIG. 5 is an axonometric view of an alternative embodiment of the toy vehicle of the invention.
Figure 6:
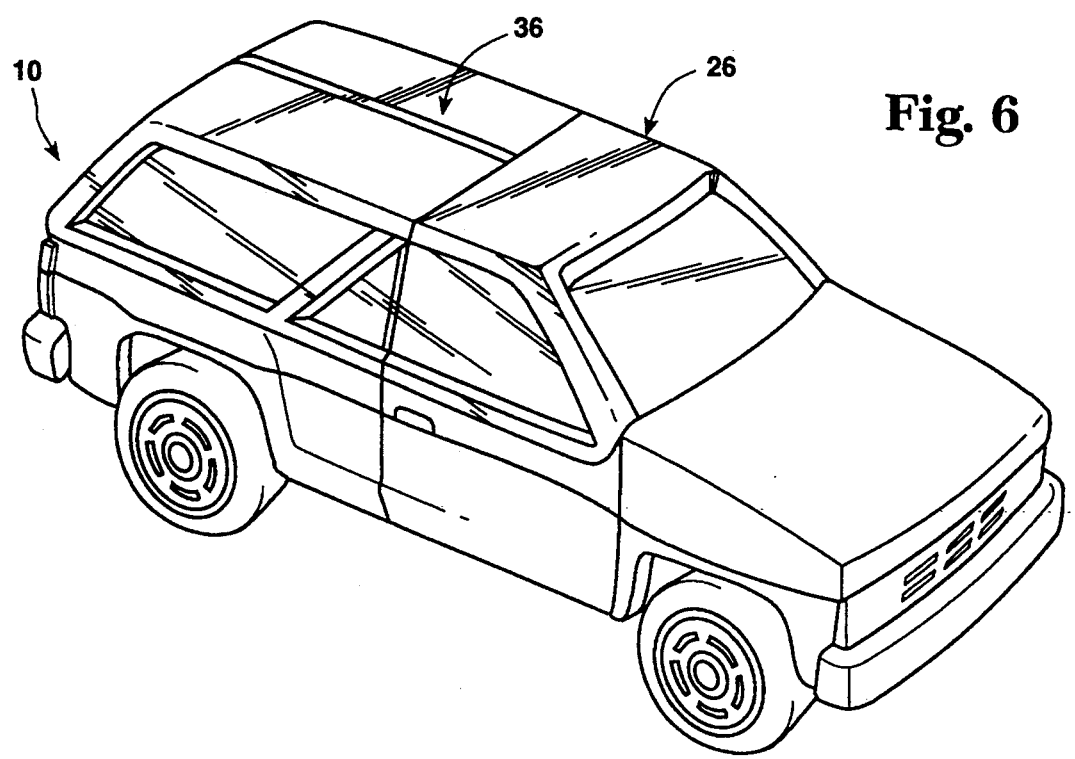
FIG. 6 is an axonometric view of a further alternative embodiment of the toy vehicle of the invention.

FIGS. 5 and 6 show alternative embodiments of a toy vehicle. These alternatives embody the same principles as set forth in describing the vehicle of FIG. 1. An optical sheet 36 is shown secured upon an inner surface of the cabin 26. The toy vehicle can have a variety of shapes and sizes and those shown in FIGS. 1, 5, and 6 are only intended to be exemplary. Preferably, the toy car vehicle embodiment of the invention is approximately 3 inches in length and one inch in width, however, other dimensions are contemplated by the invention.

Figure 7:
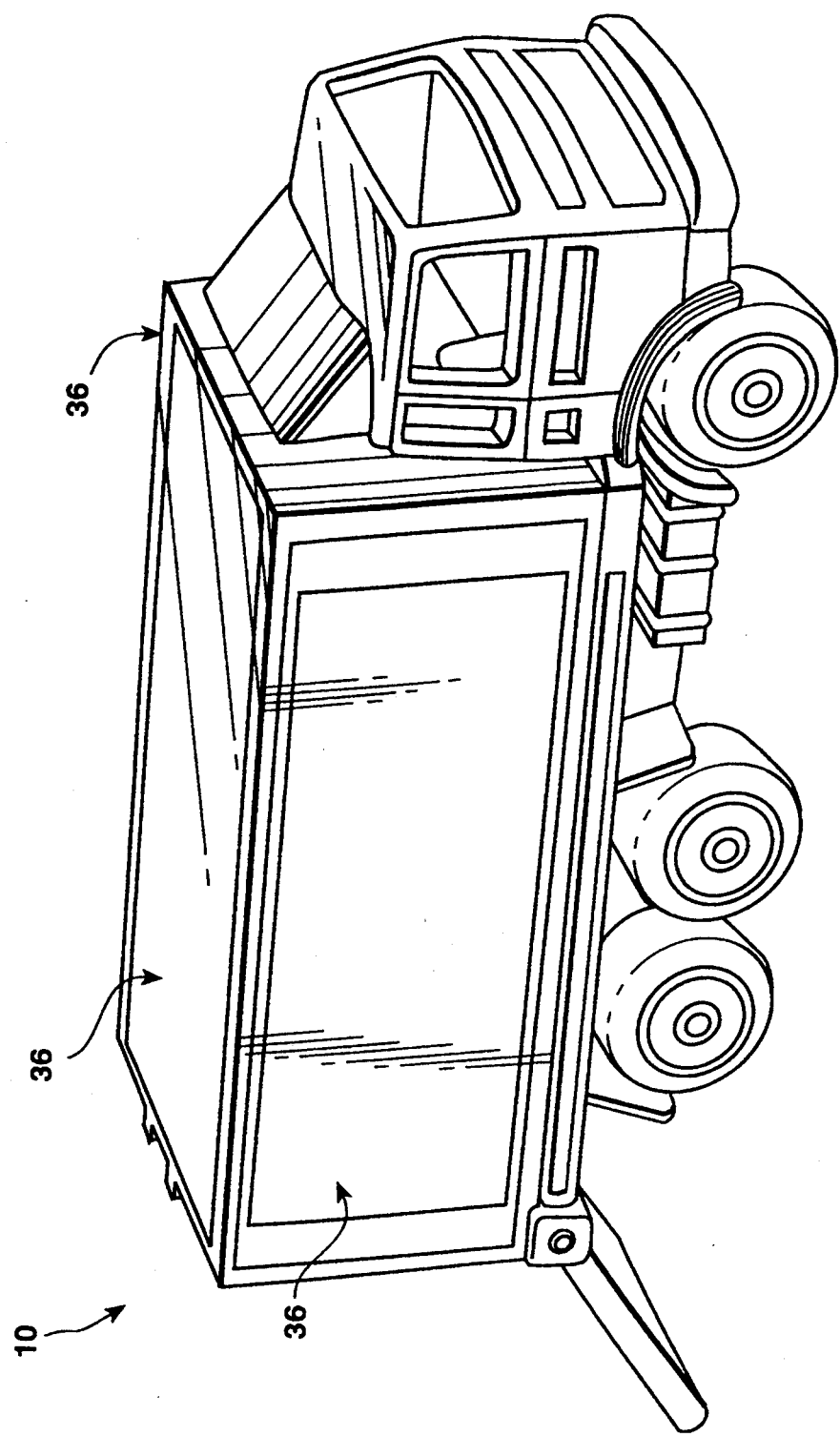
FIG. 7 is an axonometric view of yet another alternative embodiment of the toy vehicle of the invention.

FIG. 7 shows an additional alternative embodiment of the invention. Specifically, in this embodiment there are no transparent surfaces on the vehicle per se. In this, a transparent optical sheet and underlying dual image pattern is secured on an outer surface of the toy vehicle and provides for the same optical effect as described in connection with the embodiment of FIG. 1.

Figure 8:
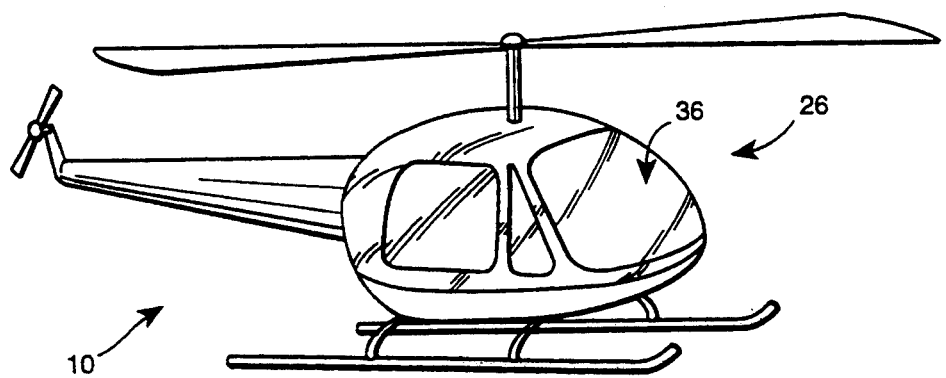
FIG. 8 is an axonometric view of an alternative embodiment of the toy vehicle in the form of a helicopter.
Figure 9:
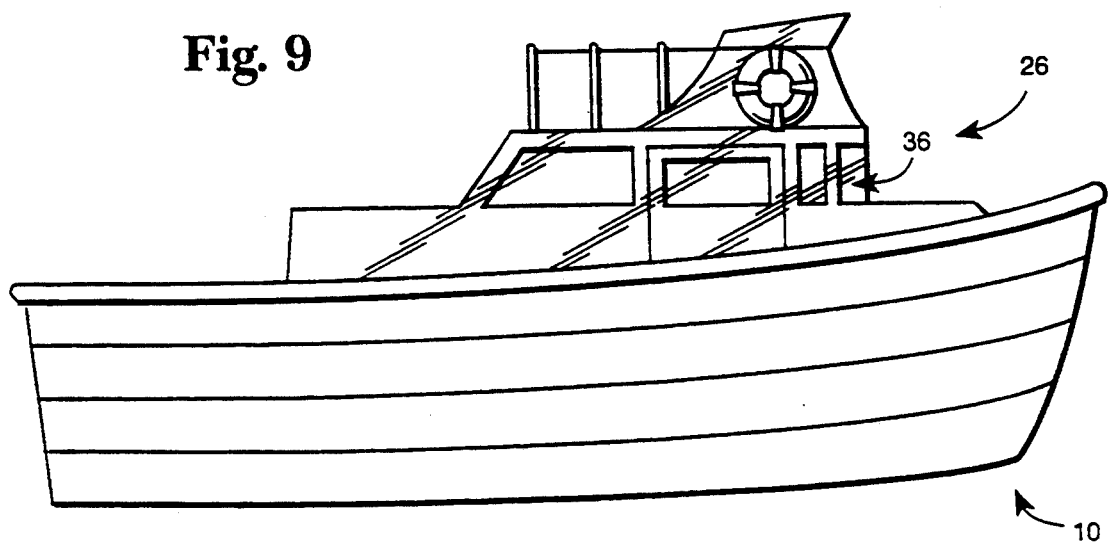
FIG. 9 is an axonometric view of an alternative embodiment of the toy vehicle in the form of a boat.
Figure 10:
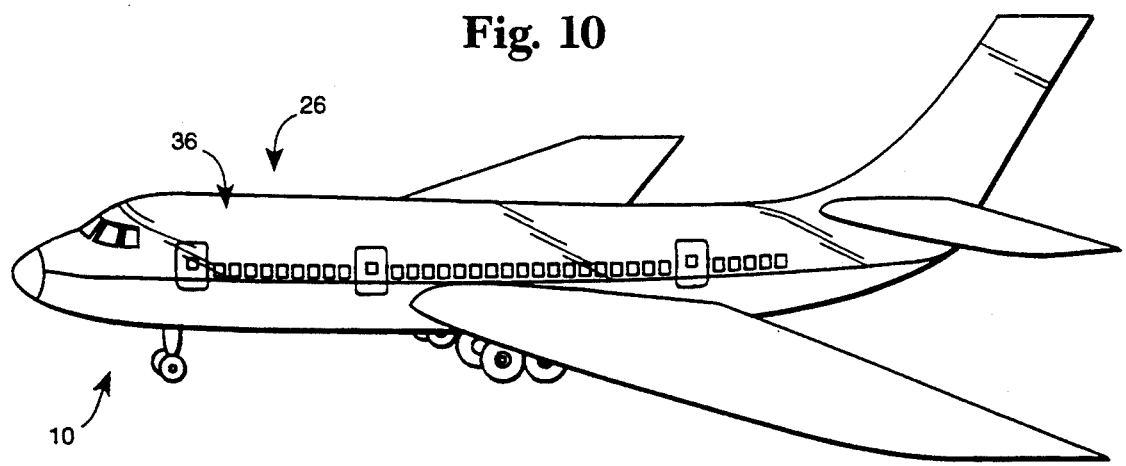
FIG. 10 is an axonometric view of an alternative embodiment of the toy vehicle in the form of an airplane.
Figure 11:
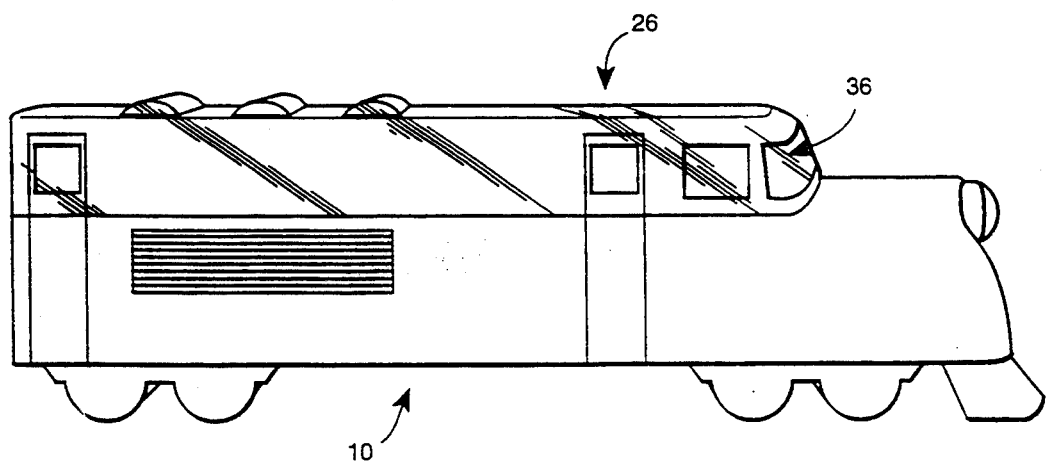
FIG. 11 is an axonometric view of an alternative embodiment of the toy vehicle in the form of a train.

Referring now to FIGS. 8, 9, 10, and 11 there is shown alternative toy vehicles of the present invention. In FIG. 8, a toy vehicle 10 comprises a helicopter having an upper section comprising a transparent cabin portion 26. As previously described with reference to the toy car vehicle depicted in FIGS. 1, 5 and 6, an optical sheet 36 is received within the cabin portion 26 for viewing through the transparent cabin surfaces. Similarly, in FIG. 9 there is shown a toy vehicle 10, depicted as a boat, having a cabin portion 26 which receives an optical sheet 36. FIGS. 10 and 11 show generic toy vehicles 10 depicted as an airplane and a train respectively having an upper portion comprising a cabin portion 26 which receives an optical sheet 36 both as previously described in connection with the toy car vehicle.

SUMMARY OF MAJOR ADVANTAGES OF THE INVENTION

After reading and understanding the foregoing detailed description of an inventive toy vehicle in accordance with preferred embodiments of the invention, it will be appreciated that several distinct advantages of the subject toy vehicle are obtained.

Without attempting to set forth all of the desirable features of the instant toy vehicle, at least some of the major advantages include a toy vehicle 10 having an optical sheet 36 secured on a surface of the vehicle such that when a toy vehicle user drives the vehicle during play, an image on the sheet 36 changes between a first image state to a second image state depending on the viewpoint of the user or cant of the vehicle.

The toy vehicle of the present invention is exciting to play with because of the unusual optical effect achieved through the use of the optical sheet secured in a transparent cabin 26 of the toy vehicle 10. The use of the optical sheet 36 provides for a toy that uses basic scientific principles in the field of optics thereby instilling an interest in a basic science. Furthermore, the changing images 48, 50, 52, 54, and 55 of the invention are humorous illustrations that provide for increased enjoyment to the toy vehicle user.

Although the toy vehicle of the present invention appears to have moving optical images, there are no moving parts, thereby reducing the cost of manufacturing. Furthermore, the toy vehicle body of the present invention is of an integral construction providing for a durable and sturdy construction.

The toy vehicles encompassed in the present invention are all functionally similar but have distinguishable designs which encourages children to collect many different versions of the toy vehicles thereby increasing user satisfaction.

The use of multiple images in five planes creates an unusual and enhanced optical effect which again is designed to enhance user satisfaction.

In describing the invention, reference has been made to a preferred embodiment and illustrative advantages of the invention. Those skilled in the art, however, and familiar with the instant disclosure of the subject invention, may recognize additions, deletions, modifications, substitutions and other changes which fall within the purview of the subject invention and claims.

What is claimed:

1. A toy vehicle comprising:

a body having a front section, rear section, left side section, right side section, a lower section, and an upper section configured to depict a toy vehicle;

said upper section includes a cabin portion which is formed to resemble a cabin of a vehicle which includes a transparent front surface, transparent rear surface, a transparent left side surface, a transparent right side surface, and a transparent top surface;

an optical sheet having first and second image states viewed through a lenticular surface and positioned within said transparent cabin adjacent all said transparent surfaces of said transparent cabin thereby conforming to the shape of the cabin such that said first and second image states can be viewed through said outer surface of said transparent cabin by a toy vehicle user; and said optical sheet constructed such that when said user moves said toy vehicle and views said optical sheet through any said transparent surface, the first image state operably changes to said second image state depending on the viewpoint of the toy vehicle user relative to the toy vehicle.

2. A toy vehicle as defined in claim 1 wherein:
   said optical sheet has a plurality of image zones such that a separate image appears in every one of said plurality of image zones whereby each image changes between said first and second image states.

3. A toy vehicle as defined in claim 2 wherein:
   said optical sheet is positioned within said cabin such that said transparent front surface, transparent rear surface, transparent left side surface, transparent right side surface, and transparent top surface each have adjacent their respective inner surfaces a corresponding image zone of said optical sheet.

4. A toy vehicle as defined in claim 1 wherein:
   said sections of said body are configured to form a toy vehicle in the shape of a car and further comprising wheel means connected to said lower section.

5. A toy vehicle as defined in claim 1 wherein:
   said sections of said body are configured to form a toy vehicle in the shape of an airplane.

6. A toy vehicle as defined in claim 1 wherein:
   said sections of said body are configured to form a toy vehicle in the shape of a boat.

7. A toy vehicle as defined in claim 1 wherein:
   said sections of said body are configured to form a toy vehicle in the shape of a helicopter.

8. A toy vehicle as defined in claim 1 wherein:
   said sections of said body are configured to form a toy vehicle in the shape of a train.

* * * * *